US012742594B2

(12) United States Patent
Baughman et al.

(10) Patent No.: US 12,742,594 B2
(45) **Date of Patent: *Sep. 22, 2026**

(54) SYSTEMS AND METHODS OF CRYO-CURING

(71) Applicant: Fortunata, LLC, Adrian, MI (US)

(72) Inventors: Greg Baughman, Adrian, MI (US); Tracee McAfee, Adrian, MI (US)

(73) Assignee: Fortunata, LLC, Adrian, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,969

(22) Filed: Jan. 7, 2022

(65) Prior Publication Data

US 2022/0128302 A1 Apr. 28, 2022

Related U.S. Application Data

(63) Continuation of application No. 16/591,747, filed on Oct. 3, 2019, now Pat. No. 11,243,028.

(60) Provisional application No. 62/880,157, filed on Jul. 30, 2019, provisional application No. 62/780,041, filed on Dec. 14, 2018.

(51) Int. Cl.

| | |
|---|---|
| ***F26B 5/06*** | (2006.01) |
| ***A24B 15/16*** | (2020.01) |
| ***A24B 15/18*** | (2006.01) |
| *B01D 11/02* | (2006.01) |

(52) U.S. Cl.
CPC ................ *F26B 5/06* (2013.01); *A24B 15/16* (2013.01); *A24B 15/18* (2013.01)

(58) Field of Classification Search
CPC ....... F26B 5/06; B01D 11/0203; A24B 15/16; A24B 15/18
See application file for complete search history.

(56) References Cited

U.S. PATENT DOCUMENTS

| | | | | |
|---|---|---|---|---|
| 2,278,472 A | | 4/1942 | Musher | |
| 3,078,586 A | | 2/1963 | Louis | |
| 3,199,217 A | * | 8/1965 | Oldenkamp | F26B 5/06 34/92 |
| 3,230,633 A | | 1/1966 | Hamilton | |
| 3,376,652 A | | 4/1968 | Hernandez | |
| 4,173,078 A | | 11/1979 | Bird et al. | |

(Continued)

FOREIGN PATENT DOCUMENTS

| | | |
|---|---|---|
| CA | 2020360 A1 | 1/1992 |
| CN | 104288227 A | 1/2015 |

(Continued)

OTHER PUBLICATIONS

Dziki, Dariusz et. al; "Simulation of the process kinetics and analysis of physicochemical properties in the freeze drying of kale"; International Agrophysics; 2018; p. 49-56 (Year: 2018).*

(Continued)

*Primary Examiner* — Michael G Hoang
*Assistant Examiner* — Logan P Jones
(74) *Attorney, Agent, or Firm* — Duane Morris LLP; Thomas J. Kowalski

(57) ABSTRACT

Methods and apparatus for cryo-curing plants are disclosed herein, which allow the plant to be picked and ready for sale and use within days. When the plant is *cannabis*, the process can deliver a product having a desired moisture content and limited loss of terpenes in just 24 to 48 hours.

22 Claims, 3 Drawing Sheets

(56) References Cited

U.S. PATENT DOCUMENTS

| | | | | |
|---|---|---|---|---|
| 4,312,134 | A | 1/1982 | Strausser | |
| 4,612,200 | A * | 9/1986 | Sato | F26B 5/048 426/385 |
| 4,780,964 | A | 11/1988 | Thompson, Sr. | |
| 5,656,343 | A | 8/1997 | Baker | |
| 6,935,049 | B2 | 8/2005 | Alstat | |
| 8,800,162 | B2 | 8/2014 | Velardi et al. | |
| 9,199,960 | B2 | 12/2015 | Ferri | |
| 9,351,953 | B2 | 5/2016 | Stodola | |
| 9,459,044 | B1 | 10/2016 | Haddock et al. | |
| 9,730,911 | B2 | 8/2017 | Verzura et al. | |
| 9,739,532 | B2 | 8/2017 | Baugh et al. | |
| 10,639,340 | B2 | 5/2020 | Young | |
| 2003/0078266 | A1 | 4/2003 | Kararli et al. | |
| 2005/0144804 | A1 | 7/2005 | Alstat | |
| 2006/0051731 | A1 * | 3/2006 | Ho | A01N 1/0221 435/2 |
| 2009/0324586 | A1 | 12/2009 | Tchessalov et al. | |
| 2010/0107436 | A1 * | 5/2010 | Velardi | F26B 5/06 700/275 |
| 2010/0297231 | A1 * | 11/2010 | Vehring | A61P 31/04 424/234.1 |
| 2011/0247234 | A1 | 10/2011 | Friess et al. | |
| 2014/0215845 | A1 * | 8/2014 | Corver | F26B 5/06 34/92 |
| 2015/0258142 | A1 | 9/2015 | Dhanaraj et al. | |
| 2016/0000843 | A1 | 1/2016 | Lowe et al. | |
| 2016/0245588 | A1 * | 8/2016 | Baugh | F26B 9/06 |
| 2017/0196923 | A1 | 7/2017 | Moore | |
| 2017/0202895 | A1 | 7/2017 | Hugh | |
| 2017/0202896 | A1 | 7/2017 | Hugh | |
| 2017/0252384 | A1 | 9/2017 | Goldner | |
| 2017/0273349 | A1 | 9/2017 | Moore | |
| 2017/0274027 | A1 | 9/2017 | Moore | |
| 2018/0008656 | A1 | 1/2018 | Watts et al. | |
| 2018/0110816 | A1 | 4/2018 | Suh et al. | |
| 2018/0125905 | A1 | 5/2018 | Letzel et al. | |
| 2018/0296616 | A1 | 10/2018 | Rivas | |
| 2018/0296617 | A1 | 10/2018 | Rivas | |
| 2018/0306763 | A1 | 10/2018 | Brucker et al. | |
| 2018/0325972 | A1 | 11/2018 | Moore | |
| 2020/0188462 | A1 | 6/2020 | Young | |
| 2020/0191480 | A1 | 6/2020 | Baughman et al. | |
| 2020/0230188 | A1 | 7/2020 | Young | |

FOREIGN PATENT DOCUMENTS

| | | | | |
|---|---|---|---|---|
| CN | 105379860 | A | 3/2016 | |
| CN | 106173079 | A * | 12/2016 | |
| CN | 106857895 | A | 6/2017 | |
| CN | 107751354 | A * | 3/2018 | A23B 7/024 |
| CN | 107773540 | A * | 3/2018 | A61K 47/02 |
| CN | 107821699 | A | 3/2018 | |
| CN | 105166133 | B | 9/2018 | |
| FR | 3050262 | A1 * | 10/2017 | F26B 11/049 |
| KR | 19990039467 | A | 6/1999 | |
| WO | 2012132590 | A1 | 10/2012 | |
| WO | 2016064987 | A1 | 4/2016 | |
| WO | 2016123475 | A1 | 8/2016 | |
| WO | 2016131809 | A1 | 8/2016 | |
| WO | 2016171997 | A2 | 10/2016 | |
| WO | 2017184642 | A1 | 10/2017 | |
| WO | 2018195562 | A1 | 10/2018 | |
| WO | 2018218148 | A1 | 11/2018 | |
| WO | 2019008088 | A1 | 1/2019 | |
| WO | WO-2019210401 | A1 * | 11/2019 | |

OTHER PUBLICATIONS

Cannafreeze, "CO2 Trimming and Freeze Drying: Crop to Cure in 24 Hours," Leafly, Nov. 9, 2017, https://www.leafly.com/news/industry/crop-cure-24-hours (11 pages).
Hudson Valley Lyomac, "Freeze Dryers Made in the USA," Cannabis 420, http://www.hudsonvalleylyomac.com/uploads/4/7/4/9/47491041/cannabis_420_freeze_dryer_050416.pdf (2 pages).
"Freeze Drying—Medicinal Cannabis Production," Scitek Australia Pty Ltd, 2019, https://medicinalcannabisproduction.com.au/cannabis-freeze-drying/ (4 pages).
Sondles, Scott, "Guide to Preserving Terpenes," Feb. 14, 2017, https://linkedin.com/pulse/guide-preserving-terpenes-scott-sondles (4 pages).
Dhydra Technologies, "Cannabis Drying," https://www.dhydratech.com/technology (4 pages).
Vekamaf, "Cabinet dryer for cannabis," https://vekamaf.com/equiment/cabinet-dryer-for-cannabis (2 pages).
EnWave Corporation, "EnWave Expands Agreement with Tilray Providing for Cannabis Drying in Portugal," Vancouver, British Columbia, Feb. 27, 2018 (Global Newswire), https://www.globalnewswire.com/news-release/2018/02/27/1396112/0/en/EnWave-Expands-Agreement-with-Tilray-Providing-for-Cannabis-Drying-in-Portugal.html (3 pages).
EnWave Corporation, "How it works," https://www.enwave.net/how-it-works (6 pages).
International Search Report issued in PCT/US2019/061412, dated Feb. 25, 2020 (5 pages).
Written Opinion of the International Searching Authority issued in PCT/US2019/061412, dated Feb. 25, 2020 (6 pages).
Canadian Office Action issued on Sep. 6, 2024 for Canadian Patent Application No. 3,121,466 (3 pages).

* cited by examiner

SYSTEMS AND METHODS OF CRYO-CURING

CROSS-REFERENCE TO RELATED APPLICATIONS

This application is a continuation of U.S. patent application Ser. No. 16/591,747, filed on Oct. 3, 2019, which claims the benefit of U.S. Provisional Application No. 62/780,041, filed on Dec. 14, 2018, and U.S. Provisional Application No. 62/880,157, filed on Jul. 30, 2019. The contents of each of these aforementioned applications are incorporated herein by reference in entirety.

FIELD OF THE INVENTION

This disclosure relates to processing plants by freezing, curing, sublimation, and/or freeze-drying. More particularly, the present disclosure relates to a method and apparatus for processing plants, for example, *cannabis*.

BACKGROUND OF THE INVENTION

Fruits, vegetables, herbs, flowers, and other food items are dried and cured in a conventional manner, with temperature and humidity control, over a period of weeks, months, or even years for some teas. During this process, often significant amounts of the product are lost through mold, mildew, loss of terpenes (essential oils), and browning of the flower and darkening of the extract, among other variables, which directly lead to loss of profit to the producer. Also, because water interferes with extractions, the botanical and food products are often thoroughly dried, causing additional loss of essential oils and darkening of the extract.

Large investments are required to set up and operate a conventional dry room, and/or purchase conventional machines for freeze-drying. Significant space must be dedicated to a conventional drying process, which alone often takes weeks or more, with the risk of product degradation.

However, in the drying of botanicals, curing is also commonly combined into one process. Freeze-drying only addresses the drying of the botanicals, and not the chemical and biological changes taking place during curing. Historically, botanicals have been dried initially, then cured or cured as part of the drying process. In some cases, it can be advantageous to dry the botanicals to a higher moisture content rapidly with the freeze drier, and then finish at different conditions under various gases to optimize the curing process while removing the risk and time from the preliminary drying step. Multiple moisture endpoints, often higher than the conventional endpoints, are desirable with botanicals depending on the end use, where traditional freeze-drying targets the 1% to 3% moisture required for extended shelf life of foodstuffs.

Traditional curing methods (e.g., line drying) for *cannabis* (e.g., hemp) plants takes 2 or 3 weeks before the product can be brought to market. Conventional freeze-drying completely degrades *cannabis* and renders the product unusable for a majority of end uses. As *cannabis* related products and treatments are increasingly developed and used, it is desirable to develop systems and methods for curing *cannabis* that preserve certain chemical compounds in the *cannabis*, including but not limited to THC, THCa, terpenes, and/or other compounds.

SUMMARY OF THE DISCLOSURE

A method of cryo-curing a plant is disclosed, including the steps of: freezing the plant for a period of at least about 1 hour at a temperature less than about −10° F., or at least about 8 hours at a temperature of about −40° F. to about −20° F.; and curing the frozen plant for a period of at least about 8 hours at a temperature below 70° F. at a pressure between about 50 millibars and about 0.167 millibars. The plant may be *cannabis*, hemp, hops, or berries. The cryo-cured plant may have a moisture content of about 5% to about 20%, or about 8% to about 12%. The cryo-cured plant may have a terpene content of loss of no more than about 0.2% by weight. Freezing may be performed in at least about 10 hours, or about 10 hours to about 20 hours, and curing, under vacuum, may be performed in at least about 10 hours, about 10 hours to about 36 hours, or about 12 hours to about 24 hours.

The plant may placed on one or more shelves and cured by: (i) heating the shelves containing the plant to a middle temperature of about 30° F. to about 65° F. for about 2 hours to about 4 hours; followed by, (ii) heating the shelves containing the plant to a high temperature of about 65° F. to less than about 70° F. for about 8 hours to about 32 hours. Alternatively, the plant may be placed on one or more shelves and cured by: (1) heating the shelves containing the plant to an initial temperature of about −5° F. to about 10° F. for about 0.5 hours to about 2 hours; (2) heating the shelves containing the plant to a second temperature of about 20° F. to about 40° F. for about 0.5 hours to about 2 hours; (3) heating the shelves containing the plant to a middle temperature of about 30° F. to about 65° F. for about 2 hours to about 4 hours; and (4) heating the shelves containing the plant to a high temperature of about 65° F. to less than about 70° F. for about 8 hours to about 32 hours.

Also disclosed is a cryo-cure machine for curing a plant, such as fruits, herbs, flowers, including a material chamber and shelves within the material chamber spaced at least about 2 inches apart.

DETAILED DESCRIPTION

Figure 1A:
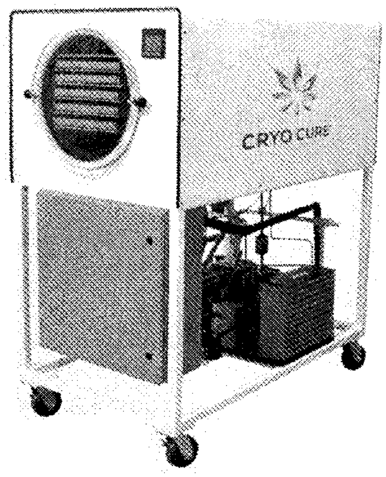
FIGS. 1A-1C are exemplary cryo-cure machines of varying sizes and design.

The systems and methods described herein may be used for cryo-curing plants, including but not limited to, vegetables, herbs, flowers, and other food items. The plant may be a whole or part (e.g., stem, root, leaf, flower, bud) of a flower, vegetable, herb, or fruit. In certain embodiments, the plant may be *cannabis*, hops, or berries. The plant may be *cannabis*. The *cannabis* processed herein may be any *cannabis* variety. The *cannabis* may contain 0.3% or less THC content by dry weight (also known as hemp), or it may contain more than 0.3% THC by dry weight. The *cannabis* may be the flowers (i.e., female plants produce large resin-secreting flowers that are trimmed down to round or pointed cannabinoid-rich buds) or trim material. The *cannabis* be cultivated for a particular end use, such as for medicated or non-medicated edibles or to be smoked. The *cannabis* may be intended for use in a CBD oil. The *cannabis* may be processed to be smoked or made into edibles or vaping oil.

Cryo-curing may be understood as a process of freezing and drying out of a material, for example, to prolong the shelf-life of the product and/or transform and maintain certain select properties for the benefit of the intended end use of the product.

Traditional curing techniques can require large amounts of money and space and can take weeks or months to complete processing. The processes disclosed herein reduce the time between when a fresh fruit, herb or flower is picked to the time that it is ready to be dispensed and/or consumed. For example, the cryo-curing process disclosed herein greatly reduces the amount of time it takes to cure freshly-picked *cannabis* to a preserved state in which the *cannabis* will not spoil and may be consumed (e.g., smoked) or optionally further processed (e.g., into an edible form, an oil form, etc.). While traditional curing processing of *cannabis* may take 2 to 3 weeks, freshly cut *cannabis* may be fully processed and ready to be dispensed and/or consumed within about 20 hours to about 46 hours, or about 24 hours to about 36 hours, by using the process disclosed herein. This increased efficiency can increase profitability for producers. In addition, cryo-cured *cannabis* may have little to no terpenes loss and have preserved trichome integrity. The amount of tetrahydrocannabinol (THC) and/or THCa in the cryo-cured *cannabis* may be higher than the levels found in *cannabis* that is processed or cured by other methods. The process disclosed herein may produce higher quality *cannabis* and with increased yields of desirable compounds (e.g. THC and/or THCa) during later extraction processes.

The systems and methods, including embodiments of the cryo-cure machine, described herein may provide for a more economical curing of products (including *cannabis*). Cryo-cure machines and the methods of curing described herein can cure large quantities of *cannabis* in a short amount of time, which can reduce the amount of time and money required to process the same amount of *cannabis* using other methods. For example, other curing processes may require large square footages of climate controlled space and the *cannabis* may need to be cured over a longer period of time. Cryo-cure machines according to aspects of the present disclosure take up less space than warehouses or other large climate controlled spaces used for other curing methods.

A method of cryo-curing a plant includes freezing the plant for a period of at least about 1 hour at a temperature of less than about −10° F., or at least about 8 hours at a temperature of about −40° F. to about −20° F., and curing the frozen plant for at least about 8 hours, or at least about 10 hours, at a temperature below 70° F. at a pressure between about 50 millibars and about 0.167 millibars.

The plant may be frozen by any means known in the art to a temperature of less than −10° F., or about −40° F. to about −20° F., or any number therebetween. The plant may be placed in a freezer separate from the machine in which it will be cured, or in a freezer attached to and part of the machine. The temperature may be about −40° F. to about −30° F., about −30° F. to about −20° F., about −35° F. to about −25° F., or about −40° F. to about −35° F. The plant may be frozen for a period of time prior to curing. That period of time may be at least about 8 hours, at least about 10 hours, about 10 to about 20 hours, about 12 to about 20 hours, about 12 to about 15 hours, or about 12 hours. While the plant may be frozen for one hour at under about −10° F., when the plant is frozen for at least about 8 hours at about −40° F. to about −20° F., better ice crystals are formed which lead to a better cured product.

Before or after freezing, the plant may be positioned on shelves, or on trays placed on shelves within a material chamber of a machine. Each tray may have a lip around its perimeter that is about 2 inches to about 3 inches, or about 2.5 inches high. After freezing and the frozen plants are placed on the trays on the shelves in the chamber, the material chamber may be placed under vacuum to achieve a pressure set to about 50 millibars to about 0.167 millibars, or 50 millibars. Once the material chamber has reached the desired pressure, the shelves are heated for a period of time to cure or dry out the plant to the desired moisture content.

In some aspects, the plant may be *cannabis* which may be freshly picked and placed on a shelf, or it may be initially frozen at a temperature of between about −40 degrees Fahrenheit and about −20 degrees Fahrenheit, and then placed on a shelf within a material chamber of a cryo-cure machine.

For curing, the material chamber may be closed and sealed and brought under vacuum to a desired starting pressure. That pressure may be about 60 millibars to about 0.167 millibars, about 50 millibars to about 0.167 millibars, about 50 millibars to about 40 millibars, about 50 millibars to about 30 millibars, about 50 millibars to about 20 millibars, about 50 millibars to about 5 millibars, about 50 millibars to about 1 millibars, about 40 millibars to about 1 millibars, or about 30 millibars to about 1 millibars. During curing, the pressure within the machine may remain between about 50 millibars and about 0.167 millibars, even though it may waver between these values as the processing continues.

After the pressure within the material chamber is brought to the desired pressure, the shelves upon which plants are positioned may be raised to a temperature maintained below 70° F. for a period of about 10 hours to about 36 hours for curing the frozen plant. Optionally, the temperature may be changed and maintained at certain desired temperature settings for a period of time, such that curing is conducted in a number of steps, e.g., from one to about 8 steps, wherein, in each step, the temperature is adjusted and maintained for a certain time period at that temperature before changing, e.g., elevating, the temperature further.

Curing of the frozen plant may take at least about 8 hours, at least about 10 hours, or about 10 to about 36 hours at a temperature below 70° F. This may be conducted in one, two, three, four, five or more steps, wherein the temperature is adjusted between the steps.

Curing may include: (i) heating the shelves containing the plant to a middle temperature of about 30° F. to about 65° F., about 40° F. to about 60° F., or about 50° F., for about 1 hours to about 4 hours, about 2 hours to about 4 hours, about 1 hour, about 2 hours, about 3 hours, or about 4 hours; followed by, (ii) heating the shelves containing the plant to a high temperature of about 60° F. to about 70° F., about 65° F. to less than about 70° F., about 66° F. to about 69° F., or about 68° F., or about 69° F. for about 8 hours to about 36 hours, about 8 hours to about 24 hours, about 8 to about 12 hours, or about 7 hours to about 12 hours, or about 12 hours, about 11 hours, about 10 hours, about 9 hours, about 8 hours, about 7 hours, about 6 hours, about 5 hours, about 4 hours, about 3 hours, about 2 hours, or about 1 hour.

In an embodiment, curing may involve the following four steps: (1) heating the shelves containing the plant to an initial temperature of about −10° F. to about 10° F., about −5° F. to about 5° F., about 0° F. to about 5° F., or about 0° F., for about 0.5 hours to about 2 hours, about 30 minutes to about 80 minutes, about 60 minutes to about 70 minutes, about 1 hour, or about 0.5 hours; (2) heating the shelves to a second temperature of about 10° F. to about 40° F., about 20° F. to about 40° F., or about 30° F., for about 0.5 hours to about 3 hours, about 0.5 hours to about 2 hours, about 30 minutes to about 80 minutes, about 60 minutes to about 70 minutes, about 1 hour, or about 0.5 hours; (3) (or (i)) heating the shelves containing the plant to a middle temperature of about 30° F. to about 65° F., about 40° F. to about 60° F., or about 50° F., for about 1 hours to about 4 hours, about 2 hours to about 4 hours, about 1 hour, about 2 hours, about 3 hours, or about 4 hours; and (4) (or (ii)) heating the shelves containing the plant to a high temperature of about 60° F. to about 70° F., about 65° F. to less than about 70° F., about 66° F. to about 69° F., about 68° F., or about 69° F. for about 8 hours to about 32 hours, about 8 to about 24 hours, about 8 to about 12 hours, or about 7 hours to about 12 hours, or about 12 hours, about 11 hours, about 10 hours, about 9 hours, about 8 hours, about 7 hours, about 6 hours, about 5 hours, about 4 hours, about 3 hours, about 2 hours, or about 1 hour.

In an embodiment, once the material chamber reaches the desired pressure, in step (1) the temperature of the shelves may be increased to about 0° F. The shelves may remain at this temperature for about 30 minutes to about 80 minutes, about 60 minutes to about 70 minutes, about 1 hour, or about 0.5 hours. The temperature of the shelves may then be increased, for example, to about 30° F. The shelves may remain at 30° F. for about 30 minutes to about 80 minutes, about 60 minutes to about 70 minutes, about 1 hour, or about 0.5 hours. The temperature of the shelves may then be increased again, for example, to about 50° F. The shelves may remain at about 50° F. for about 1 hour to about 2 hours. Alternatively, the shelves may remain at about 50° F. for about 2, 3, 4, or 5 hours. This third step may be performed for the duration needed to remove the chlorophyll from the plant. In a fourth step in curing, the temperature of the shelves may be increased to about 65° F. to less than about 70° F., or about 68.5° F. The shelves may remain at this temperature for about 7 hours to about 12 hours, or about 12 hours, about 11 hours, about 10 hours, about 9 hours, or about 8 hours. The plant may then be removed from the cryo-cure machine (after depressurization) and may be processed further for its desired use (e.g., edible, oil, etc.). The plant may be *cannabis.*

In another embodiment, when the plant is *cannabis*, once the material chamber reaches the desired pressure, in step (1) the temperature of the shelves may be increased to about 0° F. The shelves may remain at this temperature for about 30 minutes. The temperature of the shelves may then be increased, for example, to about 30° F. The shelves may remain at 30° F. for about 30 minutes. The temperature of the shelves may then be increased again, for example, to about 50° F. The shelves may remain at about 50° F. for about 1 hour to about 2 hours. In a fourth step in curing, the temperature of the shelves may be increased to about 65° F. to less than about 70° F., for about 7 hours to about 12 hours, or about 9 hours.

In another embodiment, curing may be performed in two steps: heating the shelves containing the plant to about −10° F. to about 40° F., about 0° F. to about 30° F., for about 0.5 to about 6 hours, about 1 hour to about 5 hours, about 2 hours to about 4 hours, or about 4 hours; and heating the shelves to about 40° F. to about 70° F., about 45° F. to less than about 70° F., or about 50° F. to about 69° F., for about 5 hours to about 30 hours, about 8 hours to about 20 hours, or about 10 hours to about 15 hours.

When the temperature of the shelves is increased, the increase may happen rapidly or over a longer period of time depending on the ramp rate of the shelf. The ramp rate may be about one degree F. per 30 minutes to about ten degrees F. per second, or about one degree F. per 10 seconds to about 5 degrees F. per second, and the temperature elevation will increase until the desired temperature is reached. The ramp rate may be about 1 degree per second. The ramp rate may be the same or different for each heating step in the curing process. The incremental increase of the temperature of the shelves and/or the time period that the temperature is maintained may be altered according to features of the product and the desired final moisture content. For example, the time period for curing at the highest temperature (e.g., between about 60° F. and 70° F.) may be lengthened to further reduce moisture content. The temperature of the shelves after some amount of increases in temperature may thereafter remain at a temperature that is higher than the initial temperature for a longer period of time than the shelves remained at the lower temperatures. In other words, the temperature of the shelves within the material chamber may be gradually increased over a period of time and may be held for a longer time at the highest temperature.

In an embodiment, when curing involves steps (1)-(4) above, the heating of the shelves may have a ramp rate of about one degree F. per minute to about 10 degrees F. per second, or about one degree F. per second. In another embodiment, in steps (1), (2) and (3), the heating of the shelves may have a ramp rate of about one degree F. per second. For example, in step (2), it may take 30 seconds to go from 0° F. to 30° F., and in step (3), it may take 20 seconds to go from 30° F. to 50° F.

In the final heating step at the highest temperature (but below about 70 degrees F.), e.g., step (4), the shelves may have a ramp rate such that the temperature increases over the full time period of the step. For example, when the shelves are heated to a high temperature of about 65° F. to about 69° F. for about 9 hours, the shelves may be heated stepwise gradually such that the temperature starts at 65° F. and is heated over the 9 hour period and reaches 69° F. at 9 hours (e.g., the temperature increases one degree every 2.25 hours).

Curing may be performed in at least about 10 hours. In certain embodiments, the total curing time may not exceed about 36 hours, or total curing time may not exceed about 30 hours. Curing may be performed in about 36 hours or less, about 30 hours or less, about 10 hours to about 36 hours, about 12 hours to about 24 hours, about 12 hours to about 20 hours, or about 12 hours, about 13 hours, about 14 hours, about 15 hours, about 16 hours, about 17 hours, about 18 hours, about 19 hours, about 20 hours.

The total time for processing, or cryo-curing, which includes both freezing and curing, may be less than about 50 hours, less than about 46 hours, or less than about 36 hours. In certain embodiments, the total time for processing, or cryo-curing, may be about 20 hours to about 36 hours, or about 24 hours to about 36 hours.

References to the temperature of the shelves described herein may correspond to a temperature applied to the plant (e.g., *cannabis*) on the shelves. Changes to configurations of the shelves (e.g. number, size, shape, surface features, materials, etc.) may require different temperature settings than those referenced herein. In some aspects, the temperature of the shelves and the time period at which the temperature of the shelves is maintained may be altered based on features of the product being cured, including but not limited to the density of the product.

In some embodiments, during curing, as the shelves are heated, the water and/or essential oils in the plant may sublimate and then be transferred to and collected in an ice bank (or freeze trap) where the gaseous material condenses to form a solid.

One method of cryo-curing includes freezing *cannabis* at less than about −10° F., about −40° F. to about −20° F. for a period of time prior to curing. Freezing may be performed for at least about 1 hour, at least about 8 hours, or at least about 10 hours. Freezing may be performed for about 8 hours to about 24 hours, about 10 hours to about 20 hours, or about 10 hours to about 12 hours. The *cannabis* may be frozen either in a freezer with a cryo-cure machine or in a stand alone freezer, and by any means known in the art, for example, on trays or in containers. Once frozen, the *cannabis* may be positioned, optionally on trays placed on shelves, in a material chamber of a cryo-cure machine, and placed under vacuum. The oxygen may be removed until the chamber reaches a pressure of about 50 millibars to about 0.167 millibars. The shelves holding the trays of frozen *cannabis* may then be heated to about zero degrees Fahrenheit. The shelves may remain at this temperature for about 30 minutes to about 1 hour. The temperature of the shelves may then increase to about 30° F. and may remain there for about 30 minutes to about 1 hour. Then, the temperature of the shelves may be increased to about 50 degrees Fahrenheit and may remain there for about 2 hours. Thereafter the temperature of the shelves may be increased to a higher temperature between about 60 and about 70° F. and the shelves may remain at this higher temperature for longer than 1 hour, for examples about 8 hours or about 12 hours, until the plant has the desired moisture content.

The curing of a product (for example, *cannabis*) according to methods of the present disclosure described herein, can result in a cured product that does not experience flower shrinkage. The cured product may more closely resemble the fresh cut *cannabis* than *cannabis* cured using other methods. *Cannabis* cured according to systems and methods of the present disclosure may have a higher amount of certain compounds (e.g., THC, THCa, THCΔ9). Retention of these compounds can increase the potency, yields, quality, desirability, etc. of the resulting freeze dried *cannabis*. In some aspects, curing *cannabis* according to systems and methods described herein can result in cured *cannabis* having between about 1% and 10% more THCa, for example between about 2% and about 7% more THCa, or about 2% and about 5% more THCa, about 3% and about 5% THCa.

Plants cryo-cured according to the process disclosed herein may have a lower moisture content than the same plant cured according to traditional curing methods, such as hanging the trimmed plants on drying lines. The cryo-cured plants may have any moisture content desired by the user for the end product. In certain instances, the cryo-cured plants may have a moisture content of about 0% to about 20%, about 5% to about 20%, about 8% to about 12%, about 10% to about 12%. The time of the curing step may be adjusted (increased or decreased) to achieve the desired moisture content of the cryo-cured plant (or product).

In certain embodiments, cryo-cured *cannabis* may result in a product having a lower moisture content than *cannabis* cured using other traditional curing methods. For example, the *cannabis* cured using the systems and methods described herein may have a moisture content of about 5% to about 20%, about 8% to about 12%, about 10% to about 12%. Cryo-cured *cannabis* may have a moisture content of about 1%, about 2%, about 3%, about 4%, about 5%, about 6%, about 7%, about 8%, about 9%, about 10%, about 11%, or about 12%.

Reducing the moisture content of cryo-cured *cannabis*, in particular hemp, can improve efficiency of CBD extraction because CBD is extracted from the hemp using ethanol. Having a lower moisture content can increase the amount of CBD extracted from the cryo-cured *cannabis cannabis* when using an ethanol extraction method. The moisture content of the *cannabis* can be determined via different methods, for example using a moisture meter.

*Cannabis* and hemp processed as disclosed herein may also have little to no terpene loss from curing and may have better preserved trichome integrity. Trichomes are translucent, mushroom-shaped glands on the leaves, stems, and calyxes of the *cannabis* plant. Trichomes were developed to protect the plant against predators and the elements. These clear bulbous globes produce aromatic oils called terpenes as well as resins and therapeutic cannabinoids, such as THC and CBD.

For example, when *cannabis* is freeze-dried according to traditional processes, the majority or all of the volatile terpenes are extracted from the plant during processing as the moisture content is decreased to about 0%. However, by using the processes disclosed herein, the moisture content of the plant can be controlled to, for example, about 8% to about 12%, and the amount of terpenes extracted from the plant during processing can be reduced to less than about 1%, less than about 0.5%, less than about 0.3%, less than about 0.2%, or less than about 0.1% by weight. Accordingly, the cryo-cured *cannabis* may have a terpene content of at least about 0.2%, at least about 0.5%, at least about 0.8%, or at least about 1% by weight. The cryo-cured *cannabis* may have a terpene content of about 0.2% to about 6% by weight, about 0.5% to about 4% by weight, about 0.8% to about 3% by weight, or about 1% to about 2% by weight. There may be at least 21 different terpenes present in a *cannabis* plant. For example, some of the terpenes present may include 6-limonene, β-myrcene, β-ocimene, β-caryophyllene, and 3-carene.

Plants cryo-cured according to the process disclosed herein may have leaves that flakes off easily (after curing) which can dramatically reduce trim time and labor costs, thereby reducing overall processing costs and increasing profitability. *Cannabis* cryo-cured according to the process disclosed herein may have improved quality, including about 2-5% more THCa which can provide higher yields when you process the cured *cannabis*.

Figure 1B:
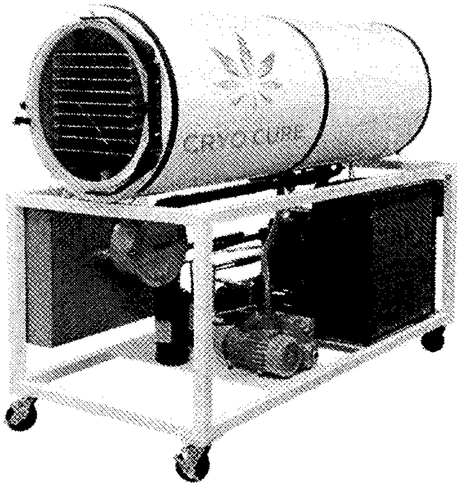
Figure 1C:
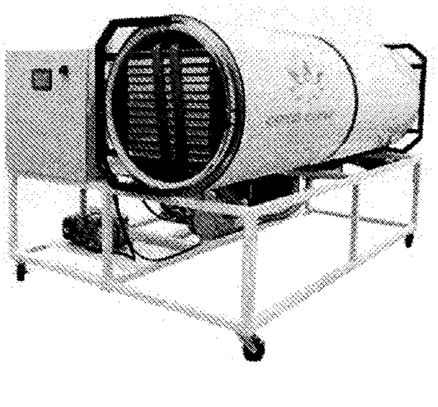
Figure 2A:
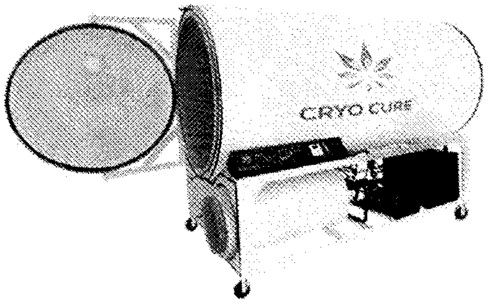
FIGS. 2A and B are larger cryo-cure machines of varying sizes and design.
Figure 2B:
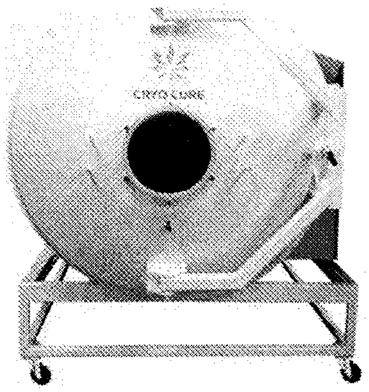

A machine for processing plants according to this disclosure (also referred to herein as "a cryo-cure machine") is also disclosed. The machine includes a material chamber, a plurality of shelves within the material chamber, an ice bank connected to the material chamber, and a plurality of mechanical components. Non-limiting exemplary cryo-cure machines are shown in FIGS. 1-2. FIG. 1A is a cryo-cure machine with a 18'×34' product chamber and 12 $ft^2$ of shelf space, with 4.6 kWh of power, and a built in material freezer. FIG. 1B is a cryo-cure machine with a 24'×52' product chamber and 35 $ft^2$ of shelf space, and 6.9 kWh of power. FIG. 1C is a cryo-cure machine with a 36×80 product chamber and 144 $ft^2$ of shelf space, and 12.5 kWh of power. FIGS. 2A and 2B are larger machines. FIG. 2A is a cryo-cure machine with a 48×104 product chamber and 300 $ft^2$ of shelf space, and 40 kWh of power. FIG. 2B is a cryo-cure machine with a 72×104 product chamber and 617 $ft^2$ of shelf space, and 75 kWh of power. Each of the machines is programmed to complete a cryo-cure cycle within 24-36 hours including defrost.

The material chamber is container able to be pressurized and temperature-controlled readily known in the art. The size of the chamber and the number of shelves used in each particular cryo-cure machine may vary according to its desired use, e.g., what plant it is being used to process. The material chamber may be about 12 $ft^2$ to about 617 $ft^2$, or larger to meet the specifications of an intended use. The material chamber may house 1 to 30 shelves, and any number in between, depending on its size and intended use. In some aspects, the shelves of the cryo-cure machine may be at least about 2 inches apart, or about 3 inches apart for providing sufficient space for receiving trays containing a product, including but not limited *cannabis*. In some aspects, the product may be positioned directly on the shelves of the machine. The size and shape of the shelves may be modified in some aspects, for example, according to the product being cured. In some aspects, a depth of the shelves may be increased to prevent flowers of a *cannabis* being cured from falling off the shelf.

The shelves may support trays on which the plant is placed for curing. The shelves and trays may be of any material suitable for use in conventional freeze-drying machines and/or known in the art.

Each shelf contains a heating element. The shelves may be heated by an electric current or by other suitable method. The tray may be made of a material suitable for conducting the heat emitted by the shelf. When the machine is in use, the shelves may be set to an initial desired temperature, which is then adjusted after a set period of time to one or more higher temperatures as the curing process continues.

The plant (e.g., flower, vegetable, herb, fruit, etc. as a whole or a part thereof) to be processed may be positioned on one or more trays on shelves within the material chamber of the cryo-cure machine. The plant may have been freshly picked or may first be frozen for a period of time prior to insertion into the material chamber. For example, a *cannabis* may have been frozen (e.g., at a temperature between about −40 degrees Fahrenheit and about −20 degrees Fahrenheit) for about 10 to about 48 hours, about 12 to about 24 hours, or about 12 hours, prior to being transferred to the material chamber.

During use of the machine, a vacuum may be applied on the machine and the material chamber can have a negative pressure environment. The vacuum pressure within the vacuum chamber during use of the machine may be between about 50 millibars and about 0.167 millibars.

In some aspects, the cryo-cure machine may include an ice bank (which may also be referred to as a freeze trap), which is connected to but separate from the material chamber. The ice bank may have a separate and individual cooling system and is used to collect the sublimed material (e.g., water and terpenes) extracted out of a plant during curing in the cryo-cure machine. The ice bank may collect extracted essential oils, taste, or other features of the plant.

The cryo-cure machine may include a freezer for freezing the plant.

The cryo-cure machine includes a plurality of mechanical components, including, but not limited to one or more compressors, one or more refrigerant components, vacuum pump (oil or nonoil), open shut valves, and others known in the art for use in freeze-drying machines.

Figure 3:
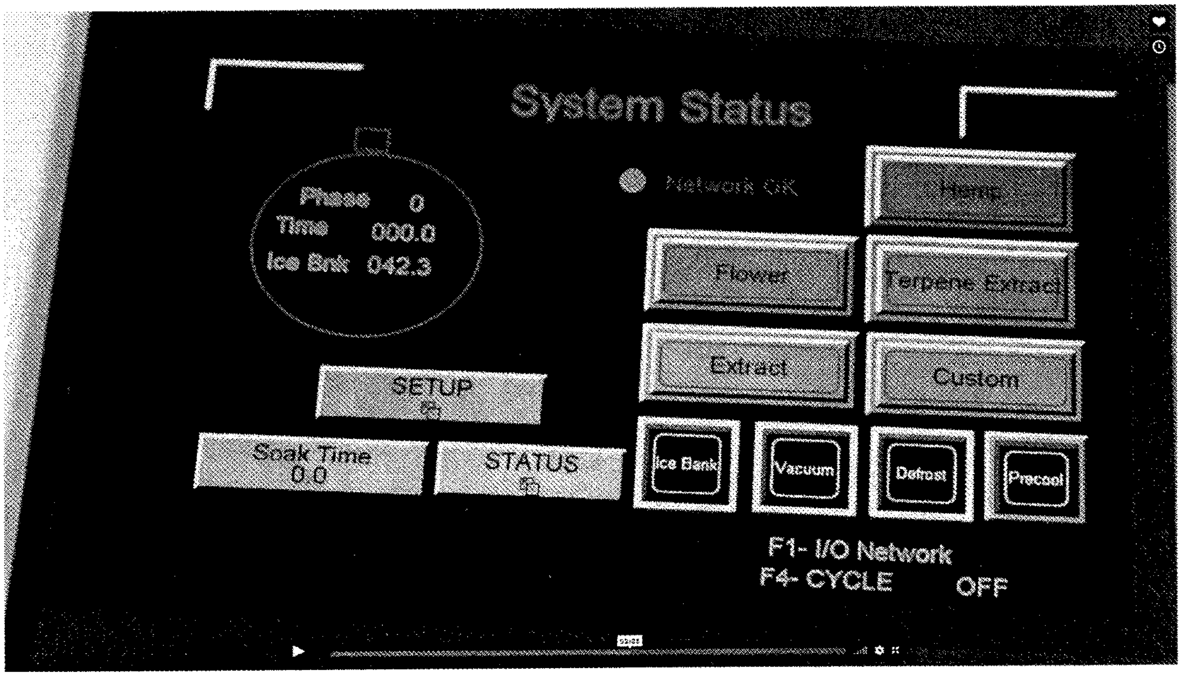
FIG. 3 is a photograph of a screen on a cryo-cure machine displaying preset programs available for the user.

The cryo-cure machine may be equipped with touch screen controllers, and may be PC compatible with data logging (embedded Ethernet and web enabled), electric defrost, customized pans. The machine may include one or more preset programs. Each present program may control the temperature of the shelves, the starting pressure within the vacuum chamber, and the time period at which the shelves are maintained at a temperature. Each program may correspond to a different product being cured, for example a type of fruit vegetable, herb, edible, etc. In some aspects, one or more programs for curing *cannabis* may be programmed on the machine. Each program may correspond to a type of *cannabis* being cured, a density of a *cannabis* being cured, or a use intended for the *cannabis* being cured (e.g. an edible, oil, smoking etc.). FIG. 3 shows an example of a screen on a cryo-cure machine showing preset programs available for the user.

The cryo-cure machine may be used to cryo-cure medicated and non-medicated edibles, fruit, vegetables, herbs, flowers, and other food items.

The above-described aspects are merely possible examples of implementations, set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure.

The features and advantages of the present invention are more fully shown by the following examples which are provided for purposes of illustration, and are not to be construed as limiting the invention in any way.

EXAMPLES

The samples in Examples 1-5, 7, 9, 11, 13, 15 and 17 were cured according to a traditional curing process. This involved cutting down the plant whole and hang drying in a room for one week at 70 degrees with a room humidity of 55 percent. The dried plant was then taken down and trimmed. After being trimmed, the dried plant was "cured" for an additional week. This curing involved sealing the *cannabis* in airtight containers and opening the containers periodically for a few minutes to allow trapped moisture to be released. In the art, this may also be referred to as burping.

The samples in Examples 6, 8, 10, 12, 14, 16, and 18 were subjected to a process of cryo-curing according to the following steps:

a. The flowers were placed on trays which were inserted into a freezer and subjected to a temperature of −20 to −30° F. for 12 hours.
b. The trays were moved to material chamber. The internal pressure of the material chamber was set and held at 0.125 Torr, and the temperature was set to 0° F. for 30 minutes.
c. The temperature was increased to 30° F. and maintained for 30 minutes.
d. The temperature was increased to 50° F. and maintained for 2 hours.
e. In a fourth curing step, the temperature was increased to about 65° F. and programmed to ramp up to 68.5° F. over the course of 9 hours, after which the trays were removed from the material chamber and processing was complete.

The internal pressure of the material chamber was held at 0.125 Torr (+/−0.025 Torr) for the duration of the curing steps (i.e., steps b. through e. above).

The values provided above regarding moisture content of cryo-cured *cannabis* are based on testing data provided by PSI Labs in Ann Arbor Mich.

Example 1—Gorilla Cookie #1

Sample No. 1802PSI0001.01716, strain Gorilla Cookie #1 was traditionally cured according to the procedure set forth above. The cannabinoid profile, terpene profile, and purity of the cured sample were tested and the results are shown in Tables 1-5.

TABLE 1

| Total Cannabinoid Profile Cannabinoids | |
|---|---|
| Total THC* | 26.23% |
| Total CBD** | 0.33% |

*Total THC = THCa * 0.877 + d9-THC
**Total CBD = CBDa * 0.877 + CBD

TABLE 2

Breakdown of Major Cannabinoid Profile

| Major Cannabinoids | Concentration (% by weight) | Error (+/− 10%) |
|---|---|---|
| Δ9-THC | 0.46 | +/− 0.05 |
| THCa | 29.38 | +/− 2.94 |
| Total THC | 26.23 | |
| CBD | <LOQ | +/− 0.00 |
| CBDa | 0.38 | +/− 0.04 |
| Total CBD | 0.33 | |
| CBN | <LOQ | +/− 0.00 |

***LOQ = Limit of Quantitation;
The reported result is based on a sample weight with the applicable moisture content for that sample.

TABLE 3

Breakdown of Minor Cannabinoid Profile

| Minor Cannabinoids | Concentration (% by weight) | Error (+/− 10%) |
|---|---|---|
| Δ8-THC | <LOQ*** | +/− 0.00 |
| CBG | <LOQ | +/− 0.00 |
| CBGa | 0.82 | +/− 0.08 |
| CBC | <LOQ | +/− 0.00 |
| THCV | <LOQ | +/− 0.00 |
| Total Cannabinoids | 31.04 | |
| Moisture | 11.3 | |

TABLE 4

Terpene Profile

| Analyte | Concentration % | Concentration mg/g |
|---|---|---|
| α-Pinene | 0.04 | 0.4 |
| Camphene | 0.02 | 0.2 |
| 3-Carene | ND | ND |
| α-Terpinene | ND | ND |
| Ocimene | ND | ND |
| β-Myrcene | 0.03 | 0.3 |
| β-Pinene | 0.05 | 0.5 |
| p-Cymene | ND | ND |
| y-Terminene | ND | ND |
| Eucalyptol | ND | ND |
| Geraniol | ND | ND |
| β-Ocimene | ND | ND |
| δ-Limonene | 0.22 | 2.2 |
| Guaiol | ND | ND |
| Cis-Nerolidol | ND | ND |
| Trans-Nerolidol | ND | ND |
| Terpinolene | 0.02 | 0.2 |
| Caryophyllene Oxide | ND | ND |
| Isopulegol | ND | ND |

TABLE 4-continued

Terpene Profile

| Analyte | Concentration % | Concentration mg/g |
|---|---|---|
| α-Humulene | 0.28 | 2.8 |
| Linalool | 0.15 | 1.5 |
| β-Caryphyllene | 0.74 | 7.4 |
| α-Bisabolol | 0.08 | 0.8 |
| Total Terpenes | 1.63% | |

TABLE 5

Purity

| Foreign Material | Present (Y/N) | Detection Method |
|---|---|---|
| Mold, Mildew, Fungus | N | Microscopy |
| Foreign Matter | N | Microscopy |
| Pests | N | Microscopy |

Example 2—Gorilla Cookie #2

A sample of the *cannabis* strain Gorilla Cookie #2 was traditionally cured according to the procedure set forth above. The cannabinoid profile, terpene profile, and purity of the cured sample were tested and the results are shown in Tables 6-10.

TABLE 6

| Total Cannabinoid Profile Cannabinoids | |
|---|---|
| Total THC | 21.95% |
| Total CBD | <LOQ |

TABLE 7

Breakdown of Major Cannabinoid Profile

| Major Cannabinoids | Concentration (% by weight) | Error (+/−10%) |
|---|---|---|
| Δ9-THC | 0.379 | +/−0.04 |
| THCa | 24.60 | +/−2.46 |
| Total THC | 21.95 | |
| CBD | <LOQ | +/−0.00 |
| CBDa | <LOQ | +/−0.00 |
| Total CBD | <LOQ | |
| CBN | <LOQ | +/−0.00 |

TABLE 8

Breakdown of Minor Cannabinoid Profile

| Minor Cannabinoids | Concentration (% by weight) | Error (+/−10%) |
|---|---|---|
| Δ8-THC | <LOQ | +/−0.00 |
| CBG | 0.14 | +/−0.01 |
| CBGa | 0.84 | +/−0.08 |
| CBC | <LOQ | +/−0.00 |
| THCV | <LOQ | +/−0.00 |
| Total Cannabinoids | 25.95 | |
| Moisture | 10.8 | |

TABLE 9

| Terpene Profile | | |
|---|---|---|
| Analyte | Concentration % | Concentration mg/g |
| α-Pinene | 0.05 | 0.5 |
| Camphene | 0.03 | 0.3 |
| 3-Carene | ND | ND |
| α-Terpinene | ND | ND |
| Ocimene | ND | ND |
| β-Myrcene | 0.03 | 0.3 |
| β-Pinene | 0.08 | 0.8 |
| p-Cymene | ND | ND |
| y-Terminene | ND | ND |
| Eucalyptol | ND | ND |
| Geraniol | ND | ND |
| β-Ocimene | ND | ND |
| δ-Limonene | 0.30 | 3.0 |
| Guaiol | ND | ND |
| Cis-Nerolidol | ND | ND |
| Trans-Nerolidol | ND | ND |
| Terpinolene | 0.02 | 0.2 |
| Caryophyllene Oxide | ND | ND |
| Isopulegol | ND | ND |
| α-Humulene | 0.17 | 1.7 |
| Linalool | 0.18 | 1.8 |
| β- Caryphyllene | 0.39 | 3.9 |
| α-Bisabolol | 0.06 | 0.6 |
| Total Terpenes | 1.32 | |

TABLE 10

| Purity | | |
|---|---|---|
| Foreign Material | Present (Y/N) | Detection Method |
| Mold, Mildew, Fungus | N | Microscopy |
| Foreign Matter | N | Microscopy |
| Pests | N | Microscopy |

Example 3—Fruity Pebbles 1

A sample of the *cannabis* strain Fruity Pebbles 1 was traditionally cured according to the procedure set forth above. The cannabinoid profile, terpene profile, and purity of the cured sample were tested and the results are shown in Tables 11-14.

TABLE 11

| Total Cannabinoid Profile Cannabinoids | |
|---|---|
| Total THC | 20.65% |
| Total CBD | <LOQ |

TABLE 12

| Breakdown of Major Cannabinoid Profile | | |
|---|---|---|
| Major Cannabinoids | Concentration (% by weight) | Error (+/−10%) |
| Δ9-THC | 0.29 | +/−0.03 |
| THCa | 23.21 | +/−2.32 |
| Total THC | 20.65 | |
| CBD | <LOQ | +/−0.00 |
| CBDa | <LOQ | +/−0.00 |
| Total CBD | <LOQ | |
| CBN | <LOQ | +/−0.00 |

TABLE 13

| Breakdown of Minor Cannabinoid Profile | | |
|---|---|---|
| Minor Cannabinoids | Concentration (% by weight) | Error (+/−10%) |
| Δ8-THC | <LOQ | +/−0.00 |
| CBG | 0.13 | +/−0.01 |
| CBGa | 1.33 | +/−0.13 |
| CBC | <LOQ | +/−0.00 |
| THCV | <LOQ | +/−0.00 |
| Total Cannabinoids | 24.97 | |
| Moisture | 8.7 | |

TABLE 14

| Purity | | |
|---|---|---|
| Foreign Material | Present (Y/N) | Detection Method |
| Mold, Mildew, Fungus | N | Microscopy |
| Foreign Matter | N | Microscopy |
| Pests | Y | Microscopy |

Example 4—Fruity Pebbles 2

A sample of the *cannabis* strain Fruity Pebbles 2 was traditionally cured according to the procedure set forth above. The cannabinoid profile, terpene profile, and purity of the cured sample were tested and the results are shown in Tables 15-18.

TABLE 15

| Total Cannabinoid Profile Cannabinoids | |
|---|---|
| Total THC | 18.01% |
| Total CBD | <LOQ |

TABLE 16

| Breakdown of Major Cannabinoid Profile | | |
|---|---|---|
| Major Cannabinoids | Concentration (% by weight) | Error (+/−10%) |
| Δ9-THC | 1.03 | +/−0.10 |
| THCa | 19.36 | +/−1.94 |
| Total THC | 18.01 | |
| CBD | <LOQ | +/−0.00 |
| CBDa | <LOQ | +/−0.00 |
| Total CBD | <LOQ | |
| CBN | <LOQ | +/−0.00 |

TABLE 17

| Breakdown of Minor Cannabinoid Profile | | |
|---|---|---|
| Minor Cannabinoids | Concentration (% by weight) | Error (+/−10%) |
| Δ8-THC | <LOQ | +/−0.00 |
| CBG | <LOQ | +/−0.00 |
| CBGa | 0.94 | +/−0.09 |
| CBC | <LOQ | +/−0.00 |
| THCV | <LOQ | +/−0.00 |
| Total Cannabinoids | 21.34 | |
| Moisture | 8.7 | |

TABLE 18

| Purity | | |
|---|---|---|
| Foreign Material | Present (Y/N) | Detection Method |
| Mold, Mildew, Fungus | N | Microscopy |
| Foreign Matter | N | Microscopy |
| Pests | Y | Microscopy |

Example 5—Original Sour Diesel

A sample of the *cannabis* strain Original Sour Diesel was traditionally cured according to the procedure set forth above. The cannabinoid profile, terpene profile, and purity of the cured sample were tested and the results are shown in Tables 19-23.

TABLE 19

| Total Cannabinoid Profile Cannabinoids | |
|---|---|
| Total THC | 24.94% |
| Total CBD | <LOQ |

TABLE 20

| Breakdown of Major Cannabinoid Profile | | |
|---|---|---|
| Major Cannabinoids | Concentration (% by weight) | Error (+/−10%) |
| Δ9-THC | 0.59 | +/−0.06 |
| THCa | 27.77 | +/−2.78 |
| Total THC | 24.94 | |
| CBD | <LOQ | +/−0.00 |
| CBDa | <LOQ | +/−0.00 |
| Total CBD | <LOQ | |
| CBN | <LOQ | +/−0.00 |

TABLE 21

| Breakdown of Minor Cannabinoid Profile | | |
|---|---|---|
| Minor Cannabinoids | Concentration (% by weight) | Error (+/−10%) |
| Δ8-THC | <LOQ | +/−0.00 |
| CBG | <LOQ | +/−0.00 |
| CBGa | 0.23 | +/−0.02 |
| CBC | <LOQ | +/−0.00 |
| THCV | <LOQ | +/−0.00 |
| Total Cannabinoids | 28.59 | |
| Moisture | 11.3 | |

TABLE 22

| Terpene Profile | | |
|---|---|---|
| Analyte | Concentration % | Concentration mg/g |
| α-Pinene | 0.06 | 0.6 |
| Camphene | 0.03 | 0.3 |
| 3-Carene | ND | ND |
| α-Terpinene | ND | ND |
| β-Ocimene | ND | ND |
| β-Myrcene | 0.41 | 4.1 |
| β-Pinene | 0.09 | 0.9 |
| p-Cymene | ND | ND |
| y-Terminene | 0.01 | 0.1 |
| Eucalyptol | ND | ND |
| Geraniol | ND | ND |
| Ocimene | ND | ND |
| δ-Limonene | 0.49 | 4.9 |
| Guaiol | 0.06 | 0.6 |
| Cis-Nerolidol | ND | ND |
| Trans-Nerolidol | ND | ND |
| Terpinolene | 0.02 | 0.2 |
| Caryophyllene Oxide | ND | ND |
| Isopulegol | ND | ND |
| α-Humulene | 0.08 | 0.8 |
| Linalool | 0.26 | 2.6 |
| β-Caryphyllene | 0.16 | 1.6 |
| α-Bisabolol | 0.03 | 0.3 |
| Total Terpenes | 1.71 | |

TABLE 23

| Purity | | |
|---|---|---|
| Foreign Material | Present (Y/N) | Detection Method |
| Mold, Mildew, Fungus | Y | Microscopy |
| Foreign Matter | N | Microscopy |
| Pests | N | Microscopy |

Notes:
Mold observed in sample

Example 6—Original Sour Diesel CRYO

A sample of the *cannabis* strain Original Sour Diesel was cryo-cured according to the procedure set forth above. The cannabinoid profile, terpene profile, and purity of the cured sample were tested and the results are shown in Tables 23-27.

TABLE 23

| Total Cannabinoid Profile Cannabinoids | |
|---|---|
| Total THC | 29.17% |
| Total CBD | <LOQ |

TABLE 24

| Breakdown of Major Cannabinoid Profile | | |
|---|---|---|
| Major Cannabinoids | Concentration (% by weight) | Error (+/−10%) |
| Δ9-THC | 0.39 | +/−0.04 |
| THCa | 32.82 | +/−3.28 |
| Total THC | 29.17 | |
| CBD | <LOQ | +/−0.00 |
| CBDa | <LOQ | +/−0.00 |
| Total CBD | <LOQ | |
| CBN | <LOQ | +/−0.00 |

TABLE 25

| Breakdown of Minor Cannabinoid Profile | | |
|---|---|---|
| Minor Cannabinoids | Concentration (% by weight) | Error (+/−10%) |
| Δ8-THC | <LOQ | +/−0.00 |
| CBG | <LOQ | +/−0.00 |
| CBGa | 0.33 | +/−0.03 |
| CBC | <LOQ | +/−0.00 |
| THCV | <LOQ | +/−0.00 |
| Total Cannabinoids | 33.54 | |
| Moisture | 12.3 | |

TABLE 26

| Terpene Profile | | |
|---|---|---|
| Analyte | Concentration % | Concentration mg/g |
| α-Pinene | 0.03 | 0.3 |
| Camphene | 0.00 | 0.0 |
| 3-Carene | ND | ND |
| α-Terpinene | ND | ND |
| β-Ocimene | ND | ND |
| β-Myrcene | 0.23 | 2.3 |
| β-Pinene | 0.08 | 0.8 |
| p-Cymene | ND | ND |
| y-Terminene | ND | ND |
| Eucalyptol | ND | ND |
| Geraniol | ND | ND |
| Ocimene | ND | ND |
| δ-Limonene | 0.56 | 5.6 |
| Guaiol | 0.08 | 0.8 |
| Cis-Nerolidol | ND | ND |
| Trans-Nerolidol | 0.02 | 0.2 |
| Terpinolene | ND | ND |
| Caryophyllene Oxide | ND | ND |
| Isopulegol | ND | ND |
| α-Humulene | 0.10 | 1.0 |
| Linalool | 0.35 | 3.5 |
| β-Caryphyllene | 0.28 | 2.8 |
| α-Bisabolol | 0.03 | 0.3 |
| Total Terpenes | 1.75 | |

TABLE 27

| Purity | | |
|---|---|---|
| Foreign Material | Present (Y/N) | Detection Method |
| Mold, Mildew, Fungus | N | Microscopy |
| Foreign Matter | N | Microscopy |
| Pests | N | Microscopy |

Example 7—GG 4

A sample of the *cannabis* strain GG 4 was traditionally cured according to the procedure set forth above. The cannabinoid profile, terpene profile, and purity of the cured sample were tested and the results are shown in Tables 28-31.

TABLE 28

| Total Cannabinoid Profile Cannabinoids | |
|---|---|
| Total THC | 19.08% |
| Total CBD | <LOQ |

TABLE 29

| Cannabinoid Profile | | | |
|---|---|---|---|
| Analyte | LOQ % | Mass % | Mass mg/g |
| THCa | 0.10 | 21.24 | 212.4 |
| Δ9-THC | 0.10 | 0.45 | 4.5 |
| Δ8-THC | 0.10 | <LOQ | <LOQ |
| THCV | 0.10 | <LOQ | <LOQ |
| CBDa | 0.10 | <LOQ | <LOQ |
| CBD | 0.10 | <LOQ | <LOQ |
| CBN | 0.10 | <LOQ | <LOQ |
| CBGa | 0.10 | 0.46 | 4.6 |
| CBG | 0.10 | <LOQ | <LOQ |
| CBC | 0.10 | <LOQ | <LOQ |
| Total | | 22.15 | 221.5 |

TABLE 30

| Terpene Profile | | | |
|---|---|---|---|
| Analyte | LOQ % | Mass % | Mass mg/g |
| β-Caryophyllene | | 0.47 | 4.7 |
| δ-Limonene | | 0.23 | 2.3 |
| β-Myrcene | | 0.37 | 3.7 |
| α-Humulene | | 0.14 | 1.4 |
| α-Bisabolol | | 0.05 | 0.5 |
| 3-Carene | | ND | ND |
| α-Pinene | | ND | ND |
| α-Terpinene | | ND | ND |
| β-Ocimene | | ND | ND |
| β-Pinene | | ND | ND |
| Camphene | | ND | ND |
| Caryophytlene Oxide | | ND | ND |
| cis-Nerolidol | | ND | ND |
| Eucatyptol | | ND | ND |
| y-Terpinene | | ND | ND |
| Geraniol | | 0.06 | 0.6 |
| Guaiol | | ND | ND |
| Isopulegol | | ND | ND |
| Linalool | | ND | ND |
| Ocimene | | ND | ND |
| p-Cymene | | ND | ND |
| Terpinolene | | ND | ND |
| Trans-Nerolidol | | ND | ND |
| Total Terpenes | | 1.31 | 13.1 |

TABLE 31

| Safety | | | |
|---|---|---|---|
| Moisture | Loss on Drying | SOP-PSIMTDD | 13.1%-Pass |
| Foreign Matter | Visual Exam | SOP-PSIMTDF | Pass |

Example 8—GG 4 CRYO

A sample of the *cannabis* strain GG 4 was cryo-cured according to the procedure set forth above. The cannabinoid profile, terpene profile, and purity of the cured sample were tested and tested and the results are shown in Tables 32-35.

TABLE 32

| Total Cannabinoid Profile Cannabinoids | |
|---|---|
| Total THC | 17.35% |
| Total CBD | <LOQ |

TABLE 33

| Cannabinoid Profile | | | |
|---|---|---|---|
| Analyte | LOQ % | Mass % | Mass mg/g |
| THCa | 0.10 | 19.36 | 193.6 |
| Δ9-THC | 0.10 | 0.37 | 3.7 |
| Δ8-THC | 0.10 | <LOQ | <LOQ |
| THCV | 0.10 | <LOQ | <LOQ |
| CBDa | 0.10 | <LOQ | <LOQ |
| CBD | 0.10 | <LOQ | <LOQ |
| CBN | 0.10 | <LOQ | <LOQ |
| CBGa | 0.10 | 0.39 | 3.9 |
| CBG | 0.10 | <LOQ | <LOQ |
| CBC | 0.10 | <LOQ | <LOQ |
| Total | | 20.13 | 201.3 |

TABLE 34

| Terpene Profile | | | |
|---|---|---|---|
| Analyte | LOQ % | Mass % | Mass mg/g |
| β-Caryophyllene | | 0.61 | 6.1 |
| δ-Limonene | | 0.22 | 2.2 |
| β-Myrcene | | 0.18 | 1.8 |
| α-Humulene | | 0.18 | 1.8 |
| α-Bisabolol | | 0.05 | 0.5 |
| 3-Carene | | ND | ND |
| α-Pinene | | ND | ND |
| α-Terpinene | | ND | ND |
| β-Ocimene | | ND | ND |
| β-Pinene | | ND | ND |
| Camphene | | ND | ND |
| Caryophytlene Oxide | | ND | ND |
| cis-Nerolidol | | ND | ND |
| Eucatyptol | | ND | ND |
| y-Terpinene | | ND | ND |
| Geraniol | | ND | ND |
| Guaiol | | ND | ND |
| Isopulegol | | ND | ND |
| Linalool | | ND | ND |

TABLE 34-continued

| Terpene Profile | | | |
|---|---|---|---|
| Analyte | LOQ % | Mass % | Mass mg/g |
| Ocimene | | ND | ND |
| p-Cymene | | ND | ND |
| Terpinolene | | ND | ND |
| Trans-Nerolidol | | ND | ND |
| Total Terpenes | | 1.24 | 12.4 |

TABLE 35

| Safety | | | |
|---|---|---|---|
| Moisture | Loss on Drying | SOP-PSIMTDD | 11.3-Pass |
| Foreign Matter | Visual Exam | SOP-PSIMTDF | Pass |

Example 9—Sorbetto

Sample ID No. 1901PSI0035.00129 of the *cannabis* strain Sorbetto was traditionally cured according to the procedure set forth above. The cannabinoid profile, terpene profile, and purity of the cured sample were tested and tested and the results are shown in Tables 36-39.

TABLE 36

| Total Cannabinoid Profile Cannabinoids | |
|---|---|
| Total THC | 11.41% |
| Total CBD | <LOQ |

TABLE 37

| Cannabinoid Profile | | | |
|---|---|---|---|
| Analyte | LOQ % | Mass % | Mass mg/g |
| THCa | 0.10 | 13.01 | 130.1 |
| Δ9-THC | 0.10 | <LOQ | <LOQ |
| Δ8-THC | 0.10 | <LOQ | <LOQ |
| THCV | 0.10 | <LOQ | <LOQ |
| CBDa | 0.10 | <LOQ | <LOQ |
| CBD | 0.10 | <LOQ | <LOQ |
| CBN | 0.10 | <LOQ | <LOQ |
| CBGa | 0.10 | 0.60 | 6.0 |
| CBG | 0.10 | <LOQ | <LOQ |
| CBC | 0.10 | <LOQ | <LOQ |
| Total | | 13.62 | 136.2 |

TABLE 38

| Terpene Profile | | | |
|---|---|---|---|
| Analyte | LOQ % | Mass % | Mass mg/g |
| β-Caryophyllene | | 0.28 | 2.8 |
| δ-Limonene | | 0.21 | 2.1 |
| β-Myrcene | | ND | ND |
| α-Humulene | | 0.06 | 0.6 |
| α-Bisabolol | | 0.07 | 0.7 |
| 3-Carene | | ND | ND |
| α-Pinene | | ND | ND |

TABLE 38-continued

| Terpene Profile | | | |
|---|---|---|---|
| Analyte | LOQ % | Mass % | Mass mg/g |
| α-Terpinene | | ND | ND |
| β-Ocimene | | ND | ND |
| β-Pinene | | ND | ND |
| Camphene | | ND | ND |
| Caryophytlene Oxide | | ND | ND |
| cis-Nerolidol | | ND | ND |
| Eucatyptol | | ND | ND |
| y-Terpinene | | ND | ND |
| Geraniol | | 0.06 | 0.6 |
| Guaiol | | ND | ND |
| Isopulegol | | ND | ND |
| Linalool | | 0.10 | 1.0 |
| Ocimene | | ND | ND |
| p-Cymene | | ND | ND |
| Terpinolene | | ND | ND |
| Trans-Nerolidol | | ND | ND |
| Total Terpenes | | 0.79 | 7.9 |

TABLE 39

| Safety | | | |
|---|---|---|---|
| Moisture | Loss on Drying | SOP-PSIMTDD | 10.8%-Pass |
| Foreign Matter | Visual Exam | SOP-PSIMTDF | Pass |

Example 10—Sorbetto CRYO

Sample ID No. 1901PSI0035.00126 of the *cannabis* strain Sorbetto was cryo-cured according to the procedure set forth above. The cannabinoid profile, terpene profile, and purity of the cured sample were tested and tested and the results are shown in Tables 40-43.

TABLE 40

| Total Cannabinoid Profile Cannabinoids | |
|---|---|
| Total THC | 11.10% |
| Total CBD | <LOQ |

TABLE 41

| Cannabinoid Profile | | | |
|---|---|---|---|
| Analyte | LOQ % | Mass % | Mass mg/g |
| THCa | 0.10 | 12.66 | 126.6 |
| Δ9-THC | 0.10 | <LOQ | <LOQ |
| Δ8-THC | 0.10 | <LOQ | <LOQ |
| THCV | 0.10 | <LOQ | <LOQ |
| CBDa | 0.10 | <LOQ | <LOQ |
| CBD | 0.10 | <LOQ | <LOQ |
| CBN | 0.10 | <LOQ | <LOQ |
| CBGa | 0.10 | 0.53 | 5.3 |
| CBG | 0.10 | <LOQ | <LOQ |
| CBC | 0.10 | <LOQ | <LOQ |
| Total | | 13.19 | 131.9 |

TABLE 42

| Terpene Profile | | | |
|---|---|---|---|
| Analyte | LOQ % | Mass % | Mass mg/g |
| β-Caryophyllene | | 0.44 | 4.4 |
| δ-Limonene | | 0.18 | 1.8 |
| β-Myrcene | | 0.11 | 1.1 |
| α-Humulene | | 0.12 | 1.2 |
| α-Bisabolol | | 0.07 | 0.7 |
| 3-Carene | | ND | ND |
| α-Pinene | | 0.04 | 0.4 |
| α-Terpinene | | ND | ND |
| β-Ocimene | | ND | ND |
| β-Pinene | | ND | ND |
| Camphene | | ND | ND |
| Caryophytlene Oxide | | ND | ND |
| cis-Nerolidol | | ND | ND |
| Eucatyptol | | ND | ND |
| y-Terpinene | | ND | ND |
| Geraniol | | ND | ND |
| Guaiol | | ND | ND |
| Isopulegol | | ND | ND |
| Linalool | | 0.07 | 0.7 |
| Ocimene | | ND | ND |
| p-Cymene | | ND | ND |
| Terpinolene | | ND | ND |
| Trans-Nerolidol | | ND | ND |
| Total Terpenes | | 1.02 | 10.2 |

TABLE 43

| Safety | | | |
|---|---|---|---|
| Moisture | Loss on Drying | SOP-PSIMTDD | 9.5%-Pass |
| Foreign Matter | Visual Exam | SOP-PSIMTDF | Pass |

Example 11—Purple Zkittlez

Sample ID No. 1901PSI0035.00130 of the *cannabis* strain Purple Zkittlez was traditionally cured according to the procedure set forth above. The cannabinoid profile, terpene profile, and purity of the cured sample were tested and tested and the results are shown in Tables 44-47.

TABLE 44

| Total Cannabinoid Profile Cannabinoids | |
|---|---|
| Total THC | 13.93% |
| Total CBD | <LOQ |

TABLE 45

| Cannabinoid Profile | | | |
|---|---|---|---|
| Analyte | LOQ % | Mass % | Mass mg/g |
| THCa | 0.10 | 15.60 | 156.0 |
| Δ9-THC | 0.10 | 0.25 | 2.5 |
| Δ8-THC | 0.10 | <LOQ | <LOQ |
| THCV | 0.10 | <LOQ | <LOQ |
| CBDa | 0.10 | <LOQ | <LOQ |
| CBD | 0.10 | <LOQ | <LOQ |

TABLE 45-continued

| Cannabinoid Profile | | | |
|---|---|---|---|
| Analyte | LOQ % | Mass % | Mass mg/g |
| CBN | 0.10 | <LOQ | <LOQ |
| CBGa | 0.10 | 0.86 | 8.6 |
| CBG | 0.10 | <LOQ | <LOQ |
| CBC | 0.10 | <LOQ | <LOQ |
| Total | | 16.71 | 167.0 |

TABLE 46

| Terpene Profile | | | |
|---|---|---|---|
| Analyte | LOQ % | Mass % | Mass mg/g |
| β-Caryophyllene | | 0.41 | 4.1 |
| δ-Limonene | | ND | ND |
| β-Myrcene | | 0.19 | 1.9 |
| α-Humulene | | 0.10 | 1.0 |
| α-Bisabolol | | ND | ND |
| 3-Carene | | ND | ND |
| α-Pinene | | ND | ND |
| α-Terpinene | | ND | ND |
| β-Ocimene | | ND | ND |
| β-Pinene | | ND | ND |
| Camphene | | ND | ND |
| Caryophytlene Oxide | | ND | ND |
| cis-Nerolidol | | ND | ND |
| Eucatyptol | | ND | ND |
| y-Terpinene | | ND | ND |
| Geraniol | | ND | ND |
| Guaiol | | ND | ND |
| Isopulegol | | ND | ND |
| Linalool | | 0.06 | 0.6 |
| Ocimene | | ND | ND |
| p-Cymene | | ND | ND |
| Terpinolene | | ND | ND |
| Trans-Nerolidol | | ND | ND |
| Total | | 0.77 | 7.7 |

TABLE 47

| Safety | | | |
|---|---|---|---|
| Moisture | Loss on Drying | SOP-PSIMTDD | 11.6%-Pass |
| Foreign Matter | Visual Exam | SOP-PSIMTDF | Pass |

Example 12—Purple Zkittlez CRYO

Sample ID No. 1901PSI0035.00127 of the *cannabis* strain Purple Zkittlez was cryo-cured according to the procedure set forth above. The cannabinoid profile, terpene profile, and purity of the cured sample were tested and tested and the results are shown in Tables 48-51.

TABLE 48

| Total Cannabinoid Profile Cannabinoids | |
|---|---|
| Total THC | 18.42% |
| Total CBD | <LOQ |

TABLE 49

| Cannabinoid Profile | | | |
|---|---|---|---|
| Analyte | LOQ % | Mass % | Mass mg/g |
| THCa | 0.10 | 20.02 | 200.2 |
| Δ9-THC | 0.10 | 0.86 | 8.6 |
| Δ8-THC | 0.10 | <LOQ | <LOQ |
| THCV | 0.10 | <LOQ | <LOQ |
| CBDa | 0.10 | <LOQ | <LOQ |
| CBD | 0.10 | <LOQ | <LOQ |
| CBN | 0.10 | <LOQ | <LOQ |
| CBGa | 0.10 | 0.43 | 4.3 |
| CBG | 0.10 | <LOQ | <LOQ |
| CBC | 0.10 | <LOQ | <LOQ |
| Total | | 21.32 | 213.2 |

TABLE 50

| Terpene Profile | | | |
|---|---|---|---|
| Analyte | LOQ % | Mass % | Mass mg/g |
| β-Caryophyllene | | 0.41 | 4.1 |
| β-Myrcene | | 0.05 | 0.5 |
| α-Humulene | | 0.12 | 1.2 |
| α-Bisabolol | | 0.04 | 0.4 |
| 3-Carene | | ND | ND |
| α-Pinene | | 0.04 | 0.4 |
| α-Terpinene | | ND | ND |
| β-Ocimene | | ND | ND |
| β-Pinene | | ND | ND |
| Camphene | | ND | ND |
| Caryophytlene Oxide | | ND | ND |
| cis-Nerolidol | | ND | ND |
| Eucatyptol | | ND | ND |
| y-Terpinene | | ND | ND |
| Geraniol | | ND | ND |
| Guaiol | | ND | ND |
| Isopulegol | | ND | ND |
| Linalool | | ND | ND |
| Ocimene | | ND | ND |
| p-Cymene | | ND | ND |
| Terpinolene | | ND | ND |
| Trans-Nerolidol | | ND | ND |
| Total Terpenes | | 0.63 | 6.3 |

TABLE 51

| Safety | | | |
|---|---|---|---|
| Moisture | Loss on Drying | SOP-PSIMTDD | 12.2%-Pass |
| Foreign Matter | Visual Exam | SOP-PSIMTDF | Pass |

Example 13—Orangeade

Sample ID No. 1901PSI10228.00898 of the *cannabis* strain Orangeade was traditionally cured according to the procedure set forth above. The cannabinoid profile, terpene profile, and purity of the cured sample were tested and tested and the results are shown in Tables 52-55.

TABLE 52

| Total Cannabinoid Profile Cannabinoids | |
|---|---|
| Total THC | 13.02% |
| Total CBD | <LOQ |

TABLE 53

| Cannabinoid Profile | | | |
|---|---|---|---|
| Analyte | LOQ % | Mass % | Mass mg/g |
| THCa | 0.10 | 14.59 | 149.9 |
| Δ9-THC | 0.10 | 0.22 | 2.2 |
| Δ8-THC | 0.10 | <LOQ | <LOQ |
| THCV | 0.10 | <LOQ | <LOQ |
| CBDa | 0.10 | <LOQ | <LOQ |
| CBD | 0.10 | <LOQ | <LOQ |
| CBN | 0.10 | <LOQ | <LOQ |
| CBGa | 0.10 | 0.77 | 7.7 |
| CBG | 0.10 | <LOQ | <LOQ |
| CBC | 0.10 | <LOQ | <LOQ |
| Total | | 15.58 | 155.8 |

TABLE 54

| Terpene Profile | | | |
|---|---|---|---|
| Analyte | LOQ % | Mass % | Mass mg/g |
| β-Caryophyllene | | ND | ND |
| δ-Limonene | | 0.23 | 2.3 |
| β-Myrcene | | ND | ND |
| α-Humulene | | ND | ND |
| α-Bisabolol | | ND | ND |
| 3-Carene | | ND | ND |
| α-Pinene | | ND | ND |
| α-Terpinene | | ND | ND |
| β-Ocimene | | ND | ND |
| β-Pinene | | ND | ND |
| Camphene | | ND | ND |
| Caryophytlene Oxide | | ND | ND |
| cis-Nerolidol | | ND | ND |
| Eucatyptol | | ND | ND |
| y-Terpinene | | ND | ND |
| Geraniol | | ND | ND |
| Guaiol | | ND | ND |
| Isopulegol | | ND | ND |
| Linalool | | ND | ND |
| Ocimene | | ND | ND |
| p-Cymene | | ND | ND |
| Terpinolene | | ND | ND |
| Trans-Nerolidol | | ND | ND |
| Total Terpenes | | 0.23 | 2.3 |

TABLE 55

| Safety | | | |
|---|---|---|---|
| Moisture | Loss on Drying | SOP-PSIMTDD | 9.1%-Pass |
| Foreign Matter | Visual Exam | SOP-PSIMTDF | Pass |

Example 14—Orangeade CRYO

Sample ID No. 1901PSI0228.00897 of the *cannabis* strain Orangeade was cryo-cured according to the procedure set forth above. The cannabinoid profile, terpene profile, and purity of the cured sample were tested and tested and the results are shown in Tables 56-59.

TABLE 56

| Total Cannabinoid Profile Cannabinoids | |
|---|---|
| Total THC | 12.72% |
| Total CBD | <LOQ |

TABLE 57

| Cannabinoid Profile | | | |
|---|---|---|---|
| Analyte | LOQ % | Mass % | Mass mg/g |
| THCa | 0.10 | 14.50 | 145.0 |
| Δ9-THC | 0.10 | <LOQ | <LOQ |
| Δ8-THC | 0.10 | <LOQ | <LOQ |
| THCV | 0.10 | <LOQ | <LOQ |
| CBDa | 0.10 | <LOQ | <LOQ |
| CBD | 0.10 | <LOQ | <LOQ |
| CBN | 0.10 | <LOQ | <LOQ |
| CBGa | 0.10 | 0.97 | 9.7 |
| CBG | 0.10 | <LOQ | <LOQ |
| CBC | 0.10 | <LOQ | <LOQ |
| Total | | 15.48 | 154.8 |

TABLE 58

| Terpene Profile | | | |
|---|---|---|---|
| Analyte | LOQ % | Mass % | Mass mg/g |
| β-Caryophyllene | | 0.06 | 0.6 |
| δ-Limonene | | 0.41 | 4.1 |
| β-Myrcene | | 0.13 | 1.3 |
| α-Humulene | | ND | ND |
| α-Bisabolol | | ND | ND |
| 3-Carene | | ND | ND |
| α-Pinene | | ND | ND |
| α-Terpinene | | ND | ND |
| β-Ocimene | | 0.10 | 1.0 |
| β-Pinene | | ND | ND |
| Camphene | | ND | ND |
| Caryophytlene Oxide | | ND | ND |
| cis-Nerolidol | | ND | ND |
| Eucatyptol | | ND | ND |
| y-Terpinene | | ND | ND |
| Geraniol | | ND | ND |
| Guaiol | | ND | ND |
| Isopulegol | | ND | ND |
| Linalool | | ND | ND |
| Ocimene | | ND | ND |
| p-Cymene | | ND | ND |
| Terpinolene | | ND | ND |
| Trans-Nerolidol | | ND | ND |
| Total Terpenes | | 0.69 | 6.9 |

TABLE 59

| Safety | | | |
|---|---|---|---|
| Moisture | Loss on Drying | SOP-PSIMTDD | 9.4%-Pass |
| Foreign Matter | Visual Exam | SOP-PSIMTDF | Pass |

Example 15—Dirty Dreds

Sample ID No. 1901PSI0228.00900 of the *cannabis* strain Dirty Dreds was traditionally cured according to the procedure set forth above. The cannabinoid profile, terpene profile, and purity of the cured sample were tested and tested and the results are shown in Tables 60-63.

TABLE 60

| Total Cannabinoid Profile Cannabinoids | |
|---|---|
| Total THC | 18.54% |
| Total CBD | <LOQ |

TABLE 61

| Cannabinoid Profile | | | |
|---|---|---|---|
| Analyte | LOQ % | Mass % | Mass mg/g |
| THCa | 0.10 | 20.66 | 206.6 |
| Δ9-THC | 0.10 | 0.43 | 4.3 |
| Δ8-THC | 0.10 | <LOQ | <LOQ |
| THCV | 0.10 | <LOQ | <LOQ |
| CBDa | 0.10 | <LOQ | <LOQ |
| CBD | 0.10 | <LOQ | <LOQ |
| CBN | 0.10 | <LOQ | <LOQ |
| CBGa | 0.10 | 1.86 | 18.6 |
| CBG | 0.10 | 0.14 | 1.4 |
| CBC | 0.10 | <LOQ | <LOQ |
| Total | | 23.09 | 230.9 |

TABLE 62

| Terpene Profile | | | |
|---|---|---|---|
| Analyte | LOQ % | Mass % | Mass mg/g |
| β-Caryophyllene | | 0.11 | 1.1 |
| δ-Limonene | | 0.16 | 1.6 |
| β-Myrcene | | 0.07 | 0.7 |
| α-Humulene | | ND | ND |
| α-Bisabolol | | ND | ND |
| 3-Carene | | ND | ND |
| α-Pinene | | 0.21 | 2.1 |
| α-Terpinene | | ND | ND |
| β-Ocimene | | 0.20 | 2.0 |
| β-Pinene | | 0.08 | 0.8 |
| Camphene | | ND | ND |
| Caryophytlene Oxide | | ND | ND |
| cis-Nerolidol | | ND | ND |
| Eucatyptol | | ND | ND |
| y-Terpinene | | ND | ND |
| Geraniol | | ND | ND |
| Guaiol | | ND | ND |
| Isopulegol | | ND | ND |
| Linalool | | 0.07 | 0.7 |
| Ocimene | | ND | ND |
| p-Cymene | | ND | ND |
| Terpinolene | | ND | ND |
| Trans-Nerolidol | | ND | ND |
| Total Terpenes | | 0.90 | 9.0 |

TABLE 63

| Safety | | | |
|---|---|---|---|
| Moisture | Loss on Drying | SOP-PSIMTDD | 8.9%-Pass |
| Foreign Matter | Visual Exam | SOP-PSIMTDF | Pass |

Example 16—Dirty Dreds CRYO

Sample ID No. 1901PSI10228.00899 of the *cannabis* strain Dirty Dreds was cryo-cured according to the procedure set forth above. The cannabinoid profile, terpene profile, and purity of the cured sample were tested and tested and the results are shown in Tables 64-67.

TABLE 64

| Total Cannabinoid Profile Cannabinoids | |
|---|---|
| Total THC | 17.89% |
| Total CBD | <LOQ |

TABLE 65

| Cannabinoid Profile | | | |
|---|---|---|---|
| Analyte | LOQ % | Mass % | Mass mg/g |
| THCa | 0.10 | 20.40 | 204.0 |
| Δ9-THC | 0.10 | <LOQ | <LOQ |
| Δ8-THC | 0.10 | <LOQ | <LOQ |
| THCV | 0.10 | <LOQ | <LOQ |
| CBDa | 0.10 | <LOQ | <LOQ |
| CBD | 0.10 | <LOQ | <LOQ |
| CBN | 0.10 | <LOQ | <LOQ |
| CBGa | 0.10 | 2.02 | 20.2 |
| CBG | 0.10 | <LOQ | <LOQ |
| CBC | 0.10 | <LOQ | <LOQ |
| Total | | 22.42 | 224.2 |

TABLE 66

| Terpene Profile | | | |
|---|---|---|---|
| Analyte | LOQ % | Mass % | Mass mg/g |
| β-Caryophyllene | | 0.14 | 1.4 |
| δ-Limonene | | 0.25 | 2.5 |
| β-Myrcene | | 0.10 | 1.0 |
| α-Humulene | | ND | ND |
| α-Bisabolol | | ND | ND |
| 3-Carene | | ND | ND |
| α-Pinene | | 0.28 | 0.28 |
| α-Terpinene | | ND | ND |
| β-Ocimene | | 0.30 | 3.0 |
| β-Pinene | | 0.11 | 1.1 |
| Camphene | | ND | ND |
| Caryophytlene Oxide | | ND | ND |
| cis-Nerolidol | | ND | ND |
| Eucatyptol | | ND | ND |
| y-Terpinene | | ND | ND |
| Geraniol | | ND | ND |
| Guaiol | | ND | ND |
| Isopulegol | | ND | ND |

TABLE 66-continued

| Terpene Profile | | | |
|---|---|---|---|
| Analyte | LOQ % | Mass % | Mass mg/g |
| Linalool | | 0.11 | 1.1 |
| Ocimene | | ND | ND |
| p-Cymene | | ND | ND |
| Terpinolene | | ND | ND |
| Trans-Nerolidol | | ND | ND |
| Total Terpenes | | 1.29 | 12.9 |

TABLE 67

| Safety | | | |
|---|---|---|---|
| Moisture | Loss on Drying | SOP-PSIMTDD | 8.4%-Pass |
| Foreign Matter | Visual Exam | SOP-PSIMTDF | Pass |

Example 17—Malibu Pie

Sample ID No. 1901PSI0228.00904 of the *cannabis* strain Malibu Pie was traditionally cured according to the procedure set forth above. The cannabinoid profile, terpene profile, and purity of the cured sample were tested and tested and the results are shown in Tables 68-71.

TABLE 68

| Total Cannabinoid Profile Cannabinoids | |
|---|---|
| Total THC | 10.29% |
| Total CBD | <LOQ |

TABLE 69

| Cannabinoid Profile | | | |
|---|---|---|---|
| Analyte | LOQ % | Mass % | Mass mg/g |
| THCa | 0.10 | 11.32 | 113.2 |
| Δ9-THC | 0.10 | 0.36 | 3.6 |
| Δ8-THC | 0.10 | <LOQ | <LOQ |
| THCV | 0.10 | <LOQ | <LOQ |
| CBDa | 0.10 | <LOQ | <LOQ |
| CBD | 0.10 | <LOQ | <LOQ |
| CBN | 0.10 | <LOQ | <LOQ |
| CBGa | 0.10 | 1.26 | 12.6 |
| CBG | 0.10 | <LOQ | <LOQ |
| CBC | 0.10 | <LOQ | <LOQ |
| Total | | 12.94 | 129.4 |

TABLE 70

| Terpene Profile | | | |
|---|---|---|---|
| Analyte | LOQ % | Mass % | Mass mg/g |
| β-Caryophyllene | | ND | ND |
| δ-Limonene | | 0.19 | 1.9 |
| β-Myrcene | | 0.93 | 9.3 |
| α-Humulene | | ND | ND |
| α-Bisabolol | | ND | ND |
| 3-Carene | | ND | ND |

TABLE 70-continued

| Terpene Profile | | | |
|---|---|---|---|
| Analyte | LOQ % | Mass % | Mass mg/g |
| α-Pinene | | 0.22 | 2.2 |
| α-Terpinene | | ND | ND |
| β-Ocimene | | ND | ND |
| β-Pinene | | ND | ND |
| Camphene | | ND | ND |
| Caryophytlene Oxide | | ND | ND |
| cis-Nerolidol | | ND | ND |
| Eucatyptol | | ND | ND |
| y-Terpinene | | ND | ND |
| Geraniol | | ND | ND |
| Guaiol | | ND | ND |
| Isopulegol | | ND | ND |
| Linalool | | ND | ND |
| Ocimene | | ND | ND |
| p-Cymene | | ND | ND |
| Terpinolene | | ND | ND |
| Trans-Nerolidol | | ND | ND |
| Total Terpenes | | 1.34 | 13.4 |

TABLE 71

| Safety | | | |
|---|---|---|---|
| Moisture | Loss on Drying | SOP-PSIMTDD | 9.2%-Pass |
| Foreign Matter | Visual Exam | SOP-PSIMTDF | Pass |

Example 18—Malibu Pie CRYO

Sample ID No. 1901PSI0228.00903 of the *cannabis* strain Malibu Pie was cryo-cured according to the procedure set forth above. The cannabinoid profile, terpene profile, and purity of the cured sample were tested and tested and the results are shown in Tables 72-75.

TABLE 72

| Total Cannabinoid Profile Cannabinoids | |
|---|---|
| Total THC | 10.82% |
| Total CBD | <LOQ |

TABLE 73

| Cannabinoid Profile | | | |
|---|---|---|---|
| Analyte | LOQ % | Mass % | Mass mg/g |
| THCa | 0.10 | 11.60 | 116.0 |
| Δ9-THC | 0.10 | 0.64 | 6.4 |
| Δ8-THC | 0.10 | <LOQ | <LOQ |
| THCV | 0.10 | <LOQ | <LOQ |
| CBDa | 0.10 | <LOQ | <LOQ |
| CBD | 0.10 | <LOQ | <LOQ |
| CBN | 0.10 | <LOQ | <LOQ |
| CBGa | 0.10 | 0.83 | 8.3 |
| CBG | 0.10 | <LOQ | <LOQ |
| CBC | 0.10 | <LOQ | <LOQ |
| Total | | 13.07 | 130.7 |

TABLE 74

| Terpene Profile | | | |
|---|---|---|---|
| Analyte | LOQ % | Mass % | Mass mg/g |
| β-Caryophyllene | | ND | ND |
| δ-Limonene | | 0.11 | 1.1 |
| β-Myrcene | | 0.72 | 7.2 |
| α-Humulene | | ND | ND |
| α-Bisabolol | | ND | ND |
| 3-Carene | | ND | ND |
| α-Pinene | | 0.17 | 1.7 |
| α-Terpinene | | ND | ND |
| β-Ocimene | | ND | ND |
| β-Pinene | | ND | ND |
| Camphene | | ND | ND |
| Caryophytlene Oxide | | ND | ND |
| cis-Nerolidol | | ND | ND |
| Eucatyptol | | ND | ND |
| y-Terpinene | | ND | ND |
| Geraniol | | ND | ND |
| Guaiol | | ND | ND |
| Isopulegol | | ND | ND |
| Linalool | | ND | ND |
| Ocimene | | ND | ND |
| p-Cymene | | ND | ND |
| Terpinolene | | ND | ND |
| Trans-Nerolidol | | ND | ND |
| Total Terpenes | | 1.00 | 10.0 |

TABLE 75

| Safety | | | |
|---|---|---|---|
| Moisture | Loss on Drying | SOP-PSIMTDD | 9.9%-Pass |
| Foreign Matter | Visual Exam | SOP-PSIMTDF | Pass |

The total THC and terpene concentrations in the strains processed by the different curing techniques were compared. The results are presented in Table 76.

TABLE 76

| Comparison of THC and Terpene Concentrations | | |
|---|---|---|
| Strain and Curing | Total THC % | Total Terpene % |
| Original Sour Diesel (Ex. 5) | 24.94 | 1.71 |
| Original Sour Diesel CRYO (Ex. 6) | 29.17 | 1.75 |
| GG4 (Ex. 7) | 19.08 | 1.31 |
| GG4 CRYO (Ex. 8) | 17.35 | 1.24 |
| Sorbetto (Ex. 9) | 11.41 | 0.79 |
| Sorbetto CRYO (Ex. 10) | 11.10 | 1.02 |
| Purple Zkittlez (Ex. 11) | 13.93 | 0.77 |
| Purple Zkittlez CRYO (Ex. 12) | 18.42 | 0.63 |
| Orangeade (Ex. 13) | 13.02 | 0.23 |
| Orangeade CRYO (Ex. 14) | 12.72 | 0.69 |
| Dirty Dreds (Ex. 15) | 18.54 | 0.90 |
| Dirty Dreds CRYO (Ex. 16) | 17.89 | 1.29 |
| Malibu Pie (Ex. 17) | 10.29 | 1.34 |
| Malibu Pie CRYO (Ex. 18) | 10.82 | 1.00 |

TABLE 77

| Difference of THC and Terpene Concentrations | | | |
|---|---|---|---|
| Strain | Difference in Total THC % between CRYO and Traditional Cured | Difference in Total TERP % between CRYO and Traditional Cured | Mold |
| Gorilla Cookie | 4.28 | 0.31 | – |
| Fruity Pebbles | 2.64 | N/A | – |
| Sour Diesel | 4.23 | 0.04 | Y |
| GG #4 | −1.73 | −0.07 | – |
| Purple Zkittlez | 4.49 | −0.14 | – |
| Sorbetto | −0.31 | 0.23 | – |
| Orangeade | −0.30 | 0.46 | – |
| Dirty Dreds | −0.65 | 0.39 | – |
| Malibu Pie | 0.53 | −0.34 | – |
| Average Diff. | 1.46 | 0.11 | |

As demonstrated by the results compared in Tables 76 and 77, when *cannabis* is cryo-cured according to the process of the invention there is an overall increase of 13% THC and an increase of 1% Terpenes. In addition, the process is complete within 24 hours with cryo-curing as compared to weeks for traditional curing. The significantly increased speed of time to market along with the potential increase in total THC and Terpene is very valuable to cultivators.

While there have been described what are presently believed to be the certain desirable embodiments of the invention, those skilled in the art will realize that changes and modifications may be made thereto without departing from the spirit of the invention, and it is intended to include all such changes and modifications as fall within the true scope of the invention. Moreover, although specific terms are employed herein, as well as in the claims that follow, they are used only in a generic and descriptive sense, and not for the purposes of limiting the described invention, nor the claims that follow.

What is claimed:

1. A method of cryo-curing a terpene-containing plant part to obtain a reduced moisture cured terpene-containing plant part having a moisture content between 8% and 20% by weight and a terpene content of about 0.2% to about 6% by weight, said terpene-containing plant part comprising a stem, a leaf, a flower, a bud, or a combination thereof, and said method comprising:

a) freezing the terpene-containing plant part for a period of at least about 1 hour at a temperature of less than about −10° F. to obtain a frozen plant part; and b) curing the frozen terpene-containing plant part at a temperature maintained below 70° F. and at a pressure between about 50 millibars and about 0.167 millibars, said curing comprising the steps of:

(i) heating a surface holding the frozen terpene-containing plant part to an initial temperature of about −5° F. to about 5° F. for a first time comprising about 30 to about 80 minutes;

(ii) heating the surface to a second temperature of about 10° F. to about 40° F. for a second time comprising about 30 minutes to about 80 minutes;

(iii) heating the surface to a third temperature of about 40° F. to about 60° F. for a third time comprising about 2 hours to about 4 hours; and, (iv) heating the surface to a fourth temperature of about 60° F. to less than about 70° F. for a fourth time comprising about 5 hours to about 12 hours, whereby the frozen terpene-containing plant part is cured at a temperature maintained below 70° F. under vacuum and obtains the reduced moisture cured terpene-containing plant part having the moisture content between about 8% to about 20% by weight and the terpene content of about 0.2% to about 6% by weight, with curing comprising steps (i) to (iv) having time comprising about 8 hours to about 18 and ⅔ hours; and wherein freezing and curing is performed within a time comprising about 19 and ⅔ hours or about 20 hours to about 36 hours.

2. The method of claim 1, wherein the initial temperature of step (i) is about 0° F.

3. The method of claim 1, wherein the second temperature of step (ii) is about 10° F.

4. The method of claim 1, wherein the third temperature of step (iii) is about 50° F.

5. The method of claim 1, wherein curing is performed in about 12 hours.

6. The method of claim 1, wherein the terpene-containing plant part comprises flower of a cannabis plant or trim material of a cannabis plant.

7. The method of claim 1, wherein the reduced moisture cured terpene-containing plant part has a moisture content of about 8% to about 12% by weight.

8. The method of claim 7, wherein the reduced moisture cured terpene-containing plant part has a moisture content of about 10% to about 12% by weight.

9. The method of claim 1, wherein the reduced moisture cured terpene-containing plant part has a terpene content of about 0.5% to about 4% by weight.

10. The method of claim 1, wherein freezing and curing is performed in about 20 hours.

11. The method of claim 1, wherein freezing and curing is performed in about 24 hours to about 36 hours.

12. The method of claim 1, wherein the terpene-containing plant part is a part of a cannabis plant, or hops.

13. The method of claim 1, wherein the fourth time comprises about 8 to about 12 hours.

14. The method of claim 1, wherein the terpene-containing plant part comprises a leaf, a flower, a bud or a combination thereof.

15. The method of claim 1, wherein the freezing and curing is performed in about 24 hours.

16. The method of claim 1, wherein the freezing and curing is performed in about 36 hours.

17. The method of claim 1, wherein the freezing is performed for at least about 8 hours.

18. The method of claim 1, wherein the freezing and curing is performed in about less than 24 hours.

19. The method of claim 1, wherein freezing and curing is performed in about 20 hours to about 36 hours.

20. The method of claim 1, wherein freezing is performed for a period comprising about 8 hours at a temperature of about −40° F. to about −20° F.

21. The method of claim 14, wherein the terpene-containing plant part is a flower or bud.

22. The method of claim 1, wherein step (iv) comprises heating the surface at ramp rate such that a temperature of the surface increases over the full time period.

* * * * *